(12) United States Patent
Surana et al.

(10) Patent No.: US 11,619,152 B2
(45) Date of Patent: Apr. 4, 2023

(54) CRANKCASE VENTILATION SYSTEMS HAVING A SWIRL BREAKER TO REDUCE PRESSURE DROP IN TANGENTIALLY EXITING FLUIDS

(71) Applicant: CUMMINS FILTRATION IP, INC., Columbus, IN (US)

(72) Inventors: Navin Surana, Pune (IN); Vijay Dinkar Kolhe, Indira Nagar (IN); Anthony Barreteau, Quimper (FR); Peter K. Herman, Stoughton, WI (US); Daniel Potratz, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 107 days.

(21) Appl. No.: 16/769,655

(22) PCT Filed: Nov. 9, 2018

(86) PCT No.: PCT/US2018/060070
§ 371 (c)(1),
(2) Date: Jun. 4, 2020

(87) PCT Pub. No.: WO2019/112755
PCT Pub. Date: Jun. 13, 2019

(65) Prior Publication Data
US 2021/0180486 A1     Jun. 17, 2021

(30) Foreign Application Priority Data
Dec. 6, 2017   (IN) ............................. 201741043739

(51) Int. Cl.
*F01M 13/04* (2006.01)
*B01D 45/16* (2006.01)

(52) U.S. Cl.
CPC ............. *F01M 13/04* (2013.01); *B01D 45/16* (2013.01); *F01M 2013/0422* (2013.01); *F01M 2013/0433* (2013.01); *F01M 2013/0438* (2013.01)

(58) Field of Classification Search
CPC ........... F01M 2013/0422; F01M 2013/0433; F01M 2013/0438; B01D 45/16; B01D 45/08; B01D 45/12
See application file for complete search history.

(56) References Cited

U.S. PATENT DOCUMENTS 2,867,267 A * 1/1959 Nerad ..................... F23C 99/00
431/352
3,296,774 A * 1/1967 Hoogendoorn ........ B01D 47/00
261/118

(Continued)

FOREIGN PATENT DOCUMENTS

| CN | 1464180 A | 12/2003 |
| CN | 101402073 A | 4/2009 |

(Continued)

OTHER PUBLICATIONS

Chinese Office Action issued for Chinese Patent Application No. CN 201880085121.7 dated Jun. 9, 2021, 18 pages.

(Continued)

*Primary Examiner* — Kurt Philip Liethen
(74) *Attorney, Agent, or Firm* — Foley & Lardner LLP

(57) ABSTRACT

A crankcase ventilation system comprises a housing defining an internal volume structured to receive a. rotating air/oil separator element. The housing has a housing inlet structured to receive a fluid and a housing outlet defined tangentially in a sidewall of the housing which is structured to allow the fluid to exit the housing. An outlet conduit is fluidly coupled to housing outlet. The outlet conduit comprises an outlet conduit first portion axially aligned with the (Continued)

housing outlet, and an outlet conduit second portion positioned downstream of the outlet, conduit first, portion. A swirl breaking structure is positioned in at least one of an outlet conduit inlet and the outlet conduit second portion. The swirl breaking structure is configured to disrupt swirling flow of the fluid into the outlet conduit so as to reduce a pressure drop experienced by the fluid as the fluid flows from the housing into the outlet conduit.

22 Claims, 11 Drawing Sheets

(56) References Cited

U.S. PATENT DOCUMENTS

| | | | | |
|---|---|---|---|---|
| 4,162,904 | A | * | 7/1979 | Clay ................. F01N 3/037 |
| | | | | 55/447 |
| 4,187,088 | A | * | 2/1980 | Hodgson ............... B01D 45/16 |
| | | | | 96/171 |
| 5,277,154 | A | | 1/1994 | McDowell |
| 6,033,450 | A | | 3/2000 | Krul et al. |
| 8,176,597 | B2 | * | 5/2012 | Stein .................... A47L 9/1658 |
| | | | | 55/424 |
| 8,555,827 | B2 | | 10/2013 | Schleiden |
| 9,545,591 | B2 | | 1/2017 | Parikh et al. |
| 9,693,665 | B2 | * | 7/2017 | Khalil ................. A47L 9/1608 |
| 10,117,551 | B2 | * | 11/2018 | Horvath ............... A47L 9/1691 |
| 10,631,697 | B2 | * | 4/2020 | Henderson ........... A47L 9/1608 |
| 2007/0175189 | A1 | | 8/2007 | Gomiciaga-Pereda et al. |
| 2009/0100811 | A1 | | 4/2009 | Scheckel et al. |
| 2011/0154856 | A1 | * | 6/2011 | Andrian ................. B01D 50/20 |
| | | | | 62/618 |
| 2011/0180051 | A1 | | 7/2011 | Schwandt et al. |
| 2012/0267294 | A1 | | 10/2012 | Herman et al. |
| 2012/0298232 | A1 | | 11/2012 | Ekholm |
| 2015/0027422 | A1 | | 1/2015 | Schwandt et al. |
| 2019/0381436 | A1 | * | 12/2019 | Kerkonian ............ B01D 50/20 |

FOREIGN PATENT DOCUMENTS

| | | |
|---|---|---|
| CN | 201635799 U | 11/2010 |
| CN | 201954523 U | 8/2011 |
| CN | 102195061 A | 9/2011 |
| CN | 102588347 A | 7/2012 |
| CN | 102596358 A | 7/2012 |
| CN | 102802774 A | 11/2012 |
| CN | 102824817 A | 12/2012 |
| CN | 103037959 A | 4/2013 |
| CN | 104265403 A | 1/2015 |
| CN | 205191864 U | 4/2016 |
| CN | 107206398 A | 9/2017 |
| CN | 107405556 A | 11/2017 |
| WO | WO-2016/159951 A1 | 10/2016 |
| WO | WO-2017/189516 A1 | 11/2017 |

OTHER PUBLICATIONS

Supplementary European Search Report issued for European Search Report issued for EP 18885642.1 dated Jul. 16, 2021, 9 pages.
International Search Report and Written Opinion issued for PCT/US2018/060070, dated Jan. 17, 2019, 9 pages.
First Office Action issued for Indian Patent Application No. 202047028116, dated Dec. 16, 2020, 6 pages.

* cited by examiner

CRANKCASE VENTILATION SYSTEMS HAVING A SWIRL BREAKER TO REDUCE PRESSURE DROP IN TANGENTIALLY EXITING FLUIDS

CROSS REFERENCE TO RELATED APPLICATIONS

The present application is a national stage of PCT Application No. PCT/US2018/060070, filed Nov. 9, 2018 which claims priority to and benefit of Indian Provisional Patent Application No. 201741043739, filed Dec. 6, 2017 and entitled "Crankcase Ventilation Systems Having a Swirl Breaker to Reduce Pressure Drop in Tangentially Exiting Fluids." The contents of these applications are incorporated herein by reference in their entirety and for all purposes.

TECHNICAL FIELD

The present disclosure related generally to a crankcase ventilation system for filtering blowby gases.

BACKGROUND

During operation of an internal combustion engine, a fraction of fluid including combustion gases can flow out of the combustion cylinder and into the crankcase of the engine. These gases are often referred to as "blowby" gases. The blowby gases include a mixture of aerosols, oils, and air. If vented directly to the ambient, the blowby gases can harm the environment. Accordingly, the blowby gases are typically routed out of the crankcase via a crankcase ventilation system. The crankcase ventilation system may pass the blowby gases through an air/oil separator (e.g., a coalescer or a coalescing filter element, a stacked disc type separator, etc.) to remove a majority of the aerosols and oils contained in the blowby gases, for example, to meet emission requirements. The filtered blowby gases ("clean" gases) are then either vented to the ambient (in open crankcase ventilation systems) or routed back to the air intake for the internal combustion engine for further combustion (in closed crankcase ventilation systems).

Some crankcase ventilation systems utilize rotating coalescer elements that increase the filter efficiency of the crankcase ventilation systems by rotating the coalescer element during filtering. In rotating coalescer elements, the contaminants (e.g., oil droplets suspended and transported by blowby gases) are separated at least in part by centrifugal separation techniques. Rotation of the rotating coalescer element creates a rotational flow in the blowby gases flowing through the crankcase ventilation system. Additionally, the rotation of the rotating coalescer element can create a pumping effect, which reduces the pressure drop through the crankcase ventilation system.

The housing used in such crankcase ventilation systems within which the rotating coalescer element is positioned may include a tangential outlet for allowing the filtered fluid (i.e., filtered blowby gases) to exit the housing. The tangential outlet may be coupled to a downstream outlet duct. As the fluid flows through the housing, for example, a circular housing, and enters the outlet duct, the rotation of the fluid flow caused by the rotating coalescer element may impart a moderate to strong swirling component in the fluid flow. This can cause significant pressure drop in the fluid as it exits the downstream outlet duct which is undesirable.

SUMMARY

Embodiments described herein relate generally to crankcase ventilation systems structured to reduce a pressure drop in a fluid exiting the crankcase ventilation system, and in particular to crankcase ventilation systems that include a housing having a tangential outlet and an outlet conduit fluidly coupled to the tangential outlet. A baffle is positioned in at least a portion of the outlet conduit and structured to reduce swirling motion in the fluid flowing into the outlet conduit.

In some embodiments, a crankcase ventilation system comprises a housing defining an internal volume structured to receive a rotating air/oil separator element. The housing has a housing inlet structured to receive a fluid, and a housing outlet defined tangentially in a sidewall of the housing. The housing outlet is structured to allow the fluid to exit the housing. An outlet conduit is fluidly coupled to the housing outlet. The outlet conduit comprises an outlet conduit first portion axially aligned with the housing outlet, and an outlet conduit second portion positioned downstream of the outlet conduit first portion. A swirl breaking structure is positioned in at least one of an outlet conduit inlet and the outlet conduit second portion. The swirl breaking structure is configured to disrupt swirling flow of the fluid into the outlet conduit so as to reduce a pressure drop experienced by the fluid as the fluid flows from the housing into the outlet conduit.

In another set of embodiments, an outlet conduit for a housing of a rotating air/oil separator element comprises an outlet conduit first portion and an outlet conduit second portion. The outlet conduit first portion has an outlet conduit inlet configured to be fluidly coupled to a housing outlet defined tangentially in a sidewall of the housing such that the outlet conduit first portion is axially aligned with the housing outlet, and the outlet conduit first portion being configured to receive fluid expelled from the housing outlet. The outlet conduit second portion is positioned downstream of the outlet conduit first portion. A swirl breaking structure is positioned in at least one of the outlet conduit inlet and the outlet conduit second portion. The swirl breaking structure is configured to disrupt swirling flow of the fluid into the outlet conduit so as to reduce a pressure drop experienced by the fluid as the fluid flows from the housing into the outlet conduit.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
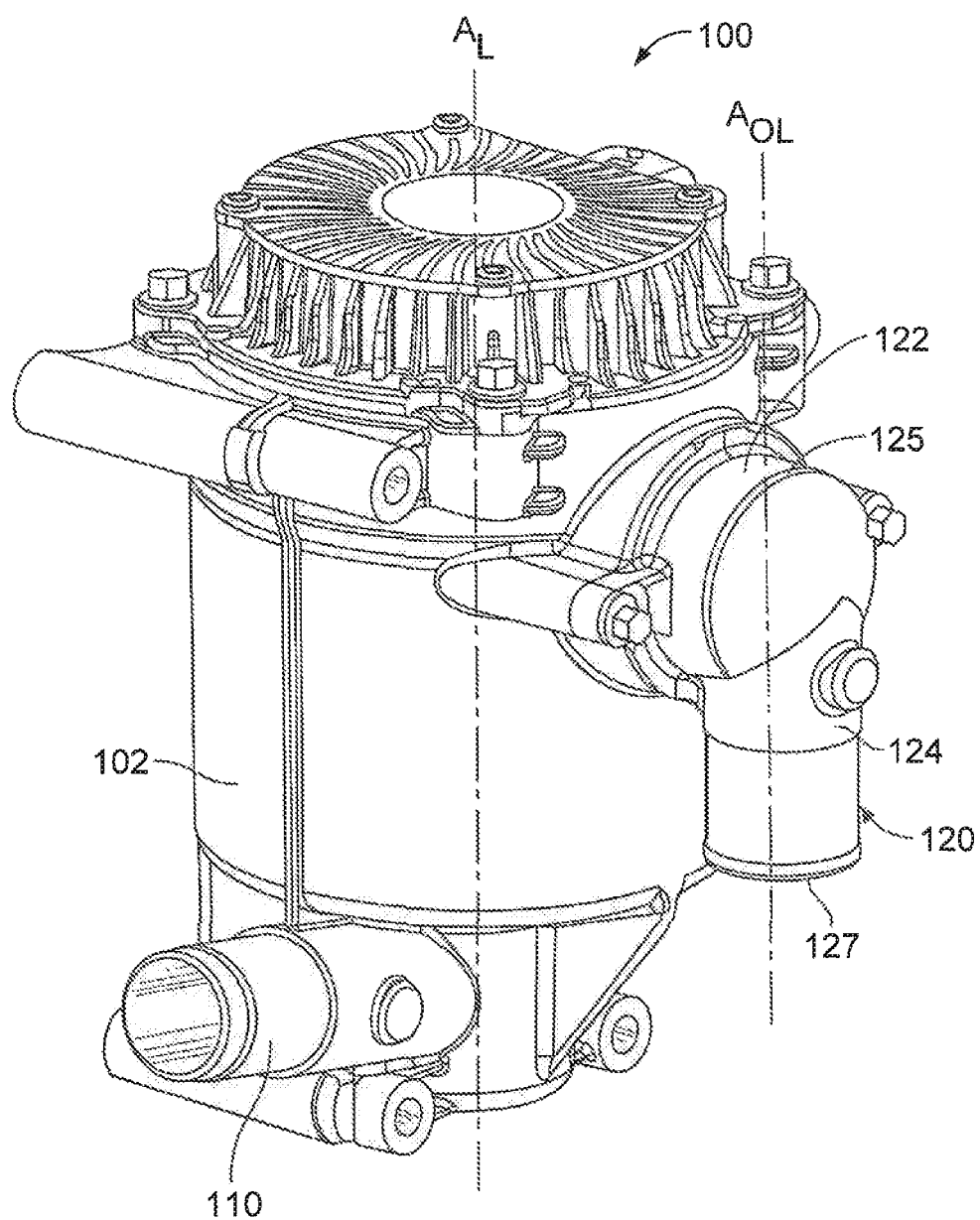
FIG. 1 is a perspective view of a crankcase ventilation system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to crankcase ventilation systems structured to reduce a pressure drop in a fluid exiting the crankcase ventilation system, and in particular to crankcase ventilation systems that include a housing having a tangential outlet and an outlet conduit fluidly coupled to the tangential outlet. A baffle is positioned in at least a portion of the outlet conduit and structured to reduce swirling motion in the fluid flowing into the outlet conduit.

Some crankcase ventilation systems utilize air/oil separator elements for example, rotating coalescer elements that increase the filter efficiency of the crankcase ventilation systems by rotating the coalescer element during filtering. In rotating coalescer elements, the contaminants (e.g., oil droplets suspended and transported by fluid i.e., blowby gases) are separated at least in part by centrifugal separation techniques. Rotation of the rotating coalescer element creates a rotational flow in the blowby gases flowing through the crankcase ventilation system. Additionally, the rotation of the rotating coalescer element can create a pumping effect, which reduces the pressure drop through the crankcase ventilation system.

The housing used in such crankcase ventilation systems within which the rotating coalescer is positioned may include a tangential outlet for allowing the filtered fluid (i.e., filtered blowby gases) to exit the housing. The tangential outlet may be coupled to a downstream outlet duct. As the fluid flows through the housing, for example, a circular housing, and enters the outlet duct, the rotation of the fluid flow caused by the rotating coalescer element may impart a moderate to strong swirling component in the fluid flow. This can cause significant pressure drop in the fluid as it exits the downstream outlet duct which is undesirable.

While the embodiments described herein refer generally to a rotating coalescer element, the concepts described herein are equally applicable to a variety of air/oil separators, including for example, stacked disc type air/oil separators.

Embodiments of the crankcase ventilation system described herein that include a swirl breaking structure may provide benefits including, for example: (1) reducing pressure drop of a fluid flow exiting the crankcase ventilation system by more than 15% in some implementations; and (2) allowing easy implementation in existing crankcase ventilation systems without significant modifications. While the concepts described herein are elucidated in context of a crankcase ventilation system, it should be appreciated that concepts of the various swirl breaking structures described herein are equally applicable to flow through any structure or housing that includes a tangential outlet.

Figure 2:
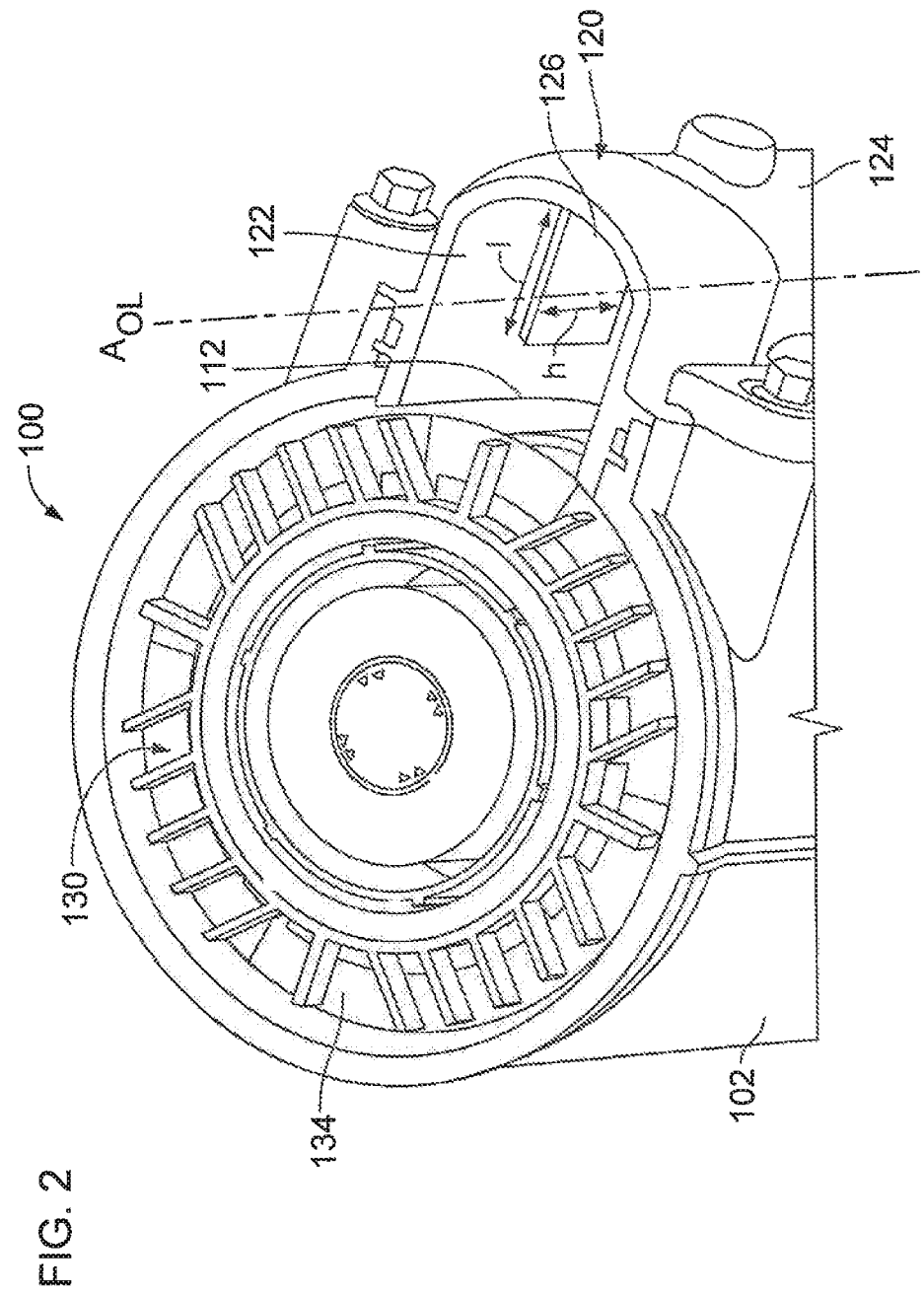
FIG. 2 is a top cross-section view of a portion of the crankcase ventilation system of FIG. 1 which includes a baffle according to a particular embodiment positioned in an outlet conduit thereof.
Figure 3:
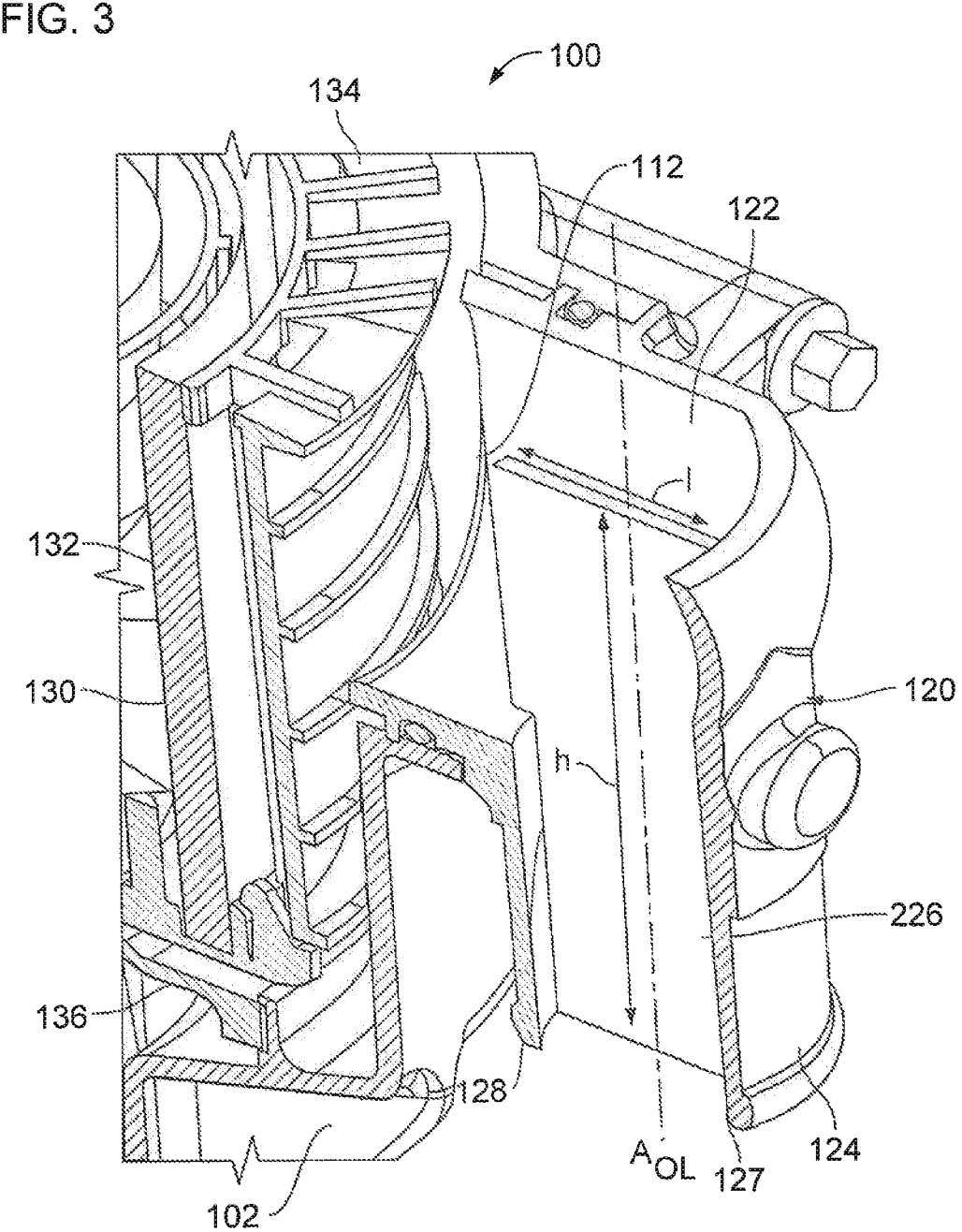
FIG. 3 is a side cross-section view of the crankcase ventilation system of FIG. 1 which includes a baffle according to another embodiment positioned in the outlet conduit thereof.

FIG. 1 is a perspective view of a crankcase ventilation system 100, according to an embodiment. FIG. 2 is a top cross-section view of a portion of the crankcase ventilation system 100. The crankcase ventilation system 100 comprises a housing 102 defining an internal volume structured to receive a rotating coalescer element 130. As shown in FIGS. 2-3, rotating coalescer element 130 is positioned within the internal volume. The rotating coalescer element 130 may comprise a separating device 132, a first endcap 134 and a second endcap 136. In various embodiments, the separating device 132 may comprise a stack of separating plates positioned between the first endcap 134 and the second endcap 136.

While shown as including the rotating coalescer element 130, in other embodiments, the crankcase ventilation system 100 may include any other oil separator, for example, a stacked disc type air/oil separator. Such stacked disc type air/oil separators may include a stack of separation discs (e.g., a stack of frustoconical separation discs) supported by a shaft connected to a rotation turbine or motor included in the crankcase ventilation system. Spacing members may be positioned between each of the separation discs so as to form flow channels therebetween.

The housing 102 includes a housing inlet 110 structured to receive a fluid (e.g., blowby gases), and a housing outlet 112 defined tangentially on a sidewall of the housing 102. The housing outlet 112 is structured to allow the fluid (e.g., filtered air with aerosols and oils removed therefrom) to exit the housing 102. The rotating coalescer element 130 may be rotated via an electric motor, hydraulic force, pneumatic force, gears, belts, pulleys etc., so as to drive the fluid through the internal volume of the housing 102 via centrifugal force. Rotation of the rotating coalescer element 130 may impart a rotational flow to the fluid flowing through the housing 102.

An outlet conduit 120 is fluidly coupled to housing outlet 112. The outlet conduit 120 comprises an outlet conduit first portion 122 axially aligned with the housing outlet 112. The outlet conduit 120 also comprises an outlet conduit second portion 124 positioned downstream of the outlet conduit first portion 122, and perpendicular thereto such that an outlet conduit second portion longitudinal axis $A_{OL}$ is a parallel to a longitudinal axis $A_L$ of the housing 102 and offset therefrom. While the outlet conduit second portion 124 is shown in FIGS. 1-3 as being perpendicular to the outlet conduit first portion 122, in other embodiments, the outlet conduit second portion 124 may extend from the outlet conduit first portion 122 at a different angle relative to a flow axis of the fluid entering the outlet conduit first portion 122.

FIG. 2 shows a baffle 126, according to a particular embodiment positioned in the outlet conduit second portion 124 of the outlet conduit 120. The baffle 126 is structured to disrupt a swirling flow of the fluid into the outlet conduit 120 so as to reduce a pressure drop experienced by the fluid as the fluid flows from the housing 102 into the outlet conduit 120. The baffle 126 comprises a vertical plate positioned in the outlet conduit second portion 124. Expanding further, the baffle 126 extends in a first direction from a first end 125 (shown in FIG. 1) of the outlet conduit second portion 124 proximal to the outlet conduit first portion 122 along the outlet conduit second portion longitudinal axis $A_{OL}$ towards an outlet conduit outlet 127, so as to define a baffle height h. The baffle height h of the baffle 126 is less than a length of the outlet conduit second portion 124.

Moreover, the baffle 126 extends in a second direction from a backwall of the outlet conduit second portion 124 towards the housing outlet 112 so as to define a baffle length l. The baffle length l of the baffle 126 is less than a width of the outlet conduit second portion 124. The baffle 126 may be integrally formed with the outlet conduit second portion 124, or the baffle 126 may include a separate vertical plate positioned within the outlet conduit second portion 124. In various embodiments, perforations, openings, slots, louvers, ribs protrusions, or any other suitable features or a combination thereof may be formed on the baffle 126, or any other baffle described herein so as to facilitate reduction in the pressure drop of the fluid.

The height h and length l of the baffle 126 may be varied to obtain a desirable reduction in pressure drop of the fluid (e.g., the blowby gases) exiting the housing 102. For example, FIG. 3 shows a baffle 226 according to another embodiment positioned in the outlet conduit second portion 124 of the crankcase ventilation system 100. The baffle 226 also comprises a vertical plate positioned in the outlet conduit second portion 124 similar to the baffle 126. However, the baffle 226 has a height h equal to the length of the outlet conduit second portion 124, and a length l equal to a width of the outlet conduit second portion 124. At a least a portion of the baffle 226 positioned proximate to the outlet conduit first portion 122, extends along the length l thereof into the outlet conduit first portion 122, for example, to the housing outlet 112.

As shown in FIG. 3, a slot 128 may be provided in a sidewall of the outlet conduit second portion 124. The slot 128 may be structured to receive an edge of the baffle 126 so as to position and/or secure the baffle 126 within the outlet conduit second portion 124. In some embodiments, the baffle 226 may provide a substantially higher reduction in pressure drop relative to the baffle 126, for example, a reduction in pressure drop of up to 20% relative to a pressure drops in the fluid flow when no swirl breaking structure is present in the outlet conduit 120.

Figure 4:
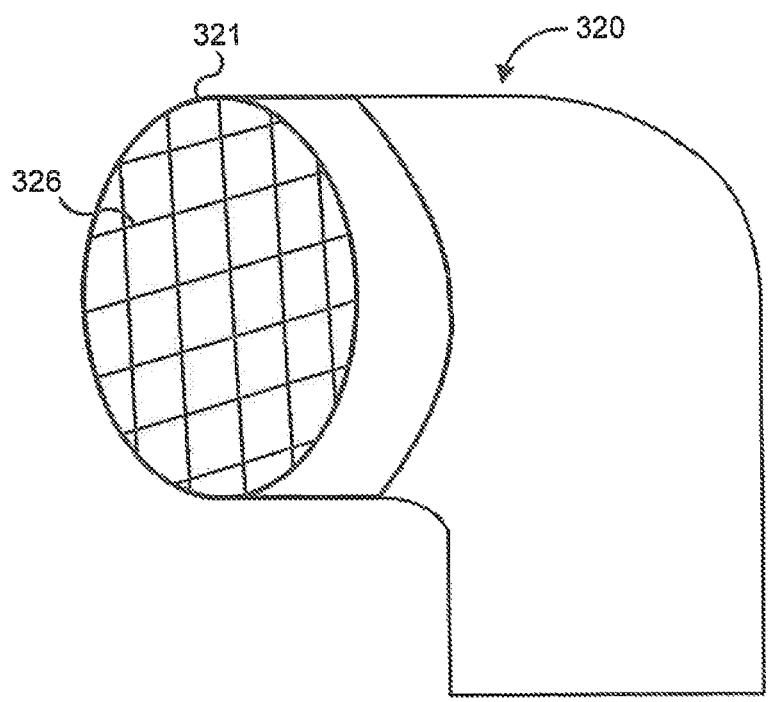
FIG. 4 is a side cross-section view of an outlet conduit including a swirl breaking structure positioned at an outlet conduit inlet thereof, according to one embodiment.

FIG. 4 is a side cross-section view of an outlet conduit 320, according to a particular embodiment. The outlet conduit 320 may be used with the crankcase ventilation system 100 or any other crankcase ventilation system described herein. The outlet conduit 320 comprises a swirl breaking structure 326 positioned at an outlet conduit inlet 321 which is structured to receive a fluid (e.g., from the crankcase ventilation system 100). The swirl breaking structure 326 comprises a mesh (e.g., a wire mesh) or a grid.

Figure 5:
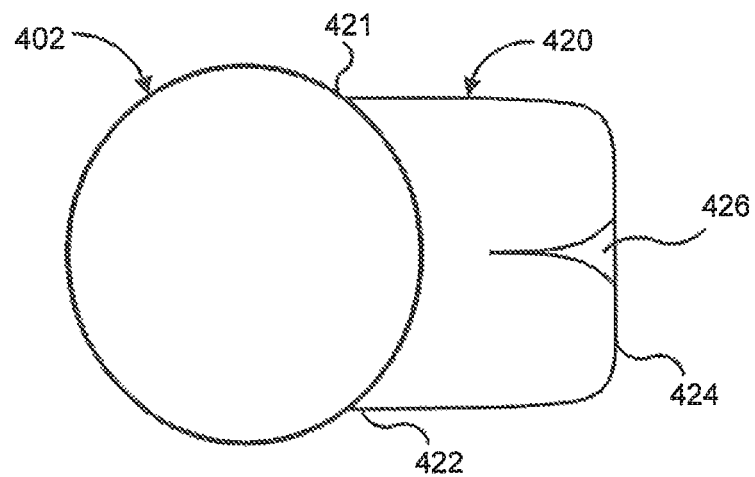
FIG. 5 is a top cross-section view of an outlet conduit including a baffle positioned in an outlet conduit second portion thereof, according to another embodiment.

FIG. 5 is a top cross-section view of an outlet conduit 420, according to another embodiment. The outlet conduit 420 comprises an outlet conduit inlet 421 fluidly coupled to a housing 402, which may be substantially similar to the housing 102 previously described herein. The outlet conduit 420 comprises an outlet conduit first portion 422 and an outlet conduit second portion 424. A baffle 426 for breaking swirls in a fluid flow into the outlet conduit 420 is positioned on a backwall of the outlet conduit second portion 424 and extends towards the outlet conduit inlet 421. The baffle 426 is structured as a wedge such that the baffle 426 includes one or more curved surfaces.

Figure 6:
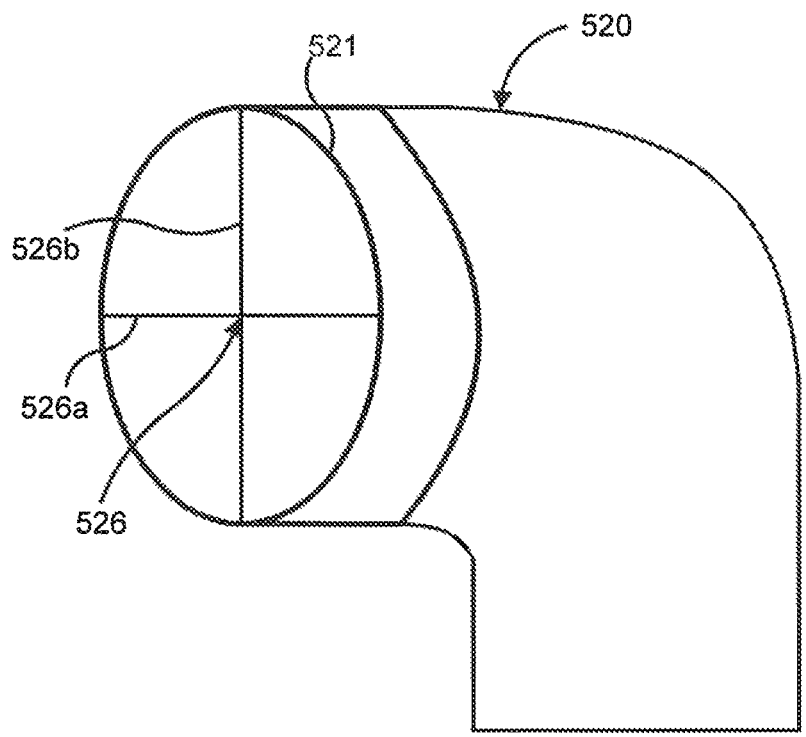
FIG. 6 is a side cross-section view of an outlet conduit including a swirl breaking structure positioned at an outlet conduit inlet thereof, according to yet another embodiment.

FIG. 6 is a side cross-section view of an outlet conduit 520, according to yet another embodiment. The outlet conduit 520 may be used with the crankcase ventilation system 100 or any other crankcase ventilation system described herein. The outlet conduit 520 comprises a swirl breaking structure 526 positioned at an outlet conduit inlet 521 which is structured to receive a fluid (e.g., from the crankcase ventilation system 100). The swirl breaking structure 526 comprises a first plate 526a positioned horizontally, and a second plate 526b positioned vertically in the outlet conduit inlet 521 such that the first plate 526a and the second plate 526b intersect at their midpoints so as to form a cross shape.

Figure 7:
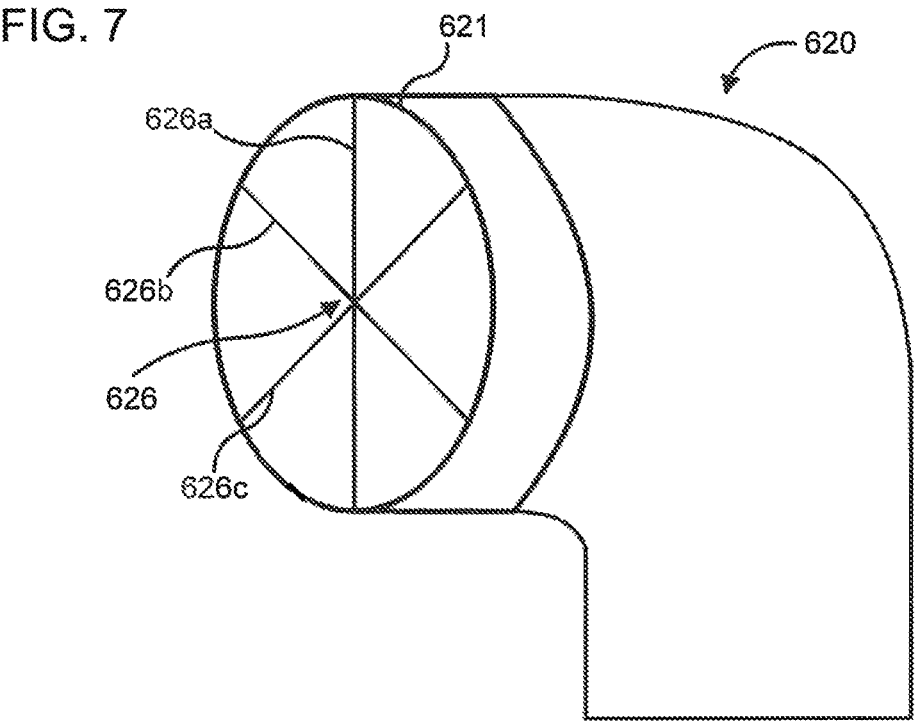
FIG. 7 is a side cross-section view of an outlet conduit including a swirl breaking structure positioned at an outlet conduit inlet thereof, according to still another embodiment.

FIG. 7 is a side cross-section view of an outlet conduit 620, according to still another embodiment. The outlet conduit 620 may be used with the crankcase ventilation system 100 or any other crankcase ventilation system described herein. The outlet conduit 620 comprises a swirl breaking structure 626 positioned at an outlet conduit inlet 621 which is structured to receive a fluid (e.g., from the crankcase ventilation system 100). The swirl breaking structure 626 comprises a first plate 626a positioned vertically in the outlet conduit inlet 621. The swirl breaking structure 626 further comprises a second plate 626b positioned diagonally at a first angle in the outlet conduit inlet 621, and a third plate 626c, also positioned diagonally in the outlet conduit inlet 621 at a second angle to the second plate 626b. The first plate 626a, the second plate 626b and the third plate 626c intersect at their respective midpoints.

Figure 8:
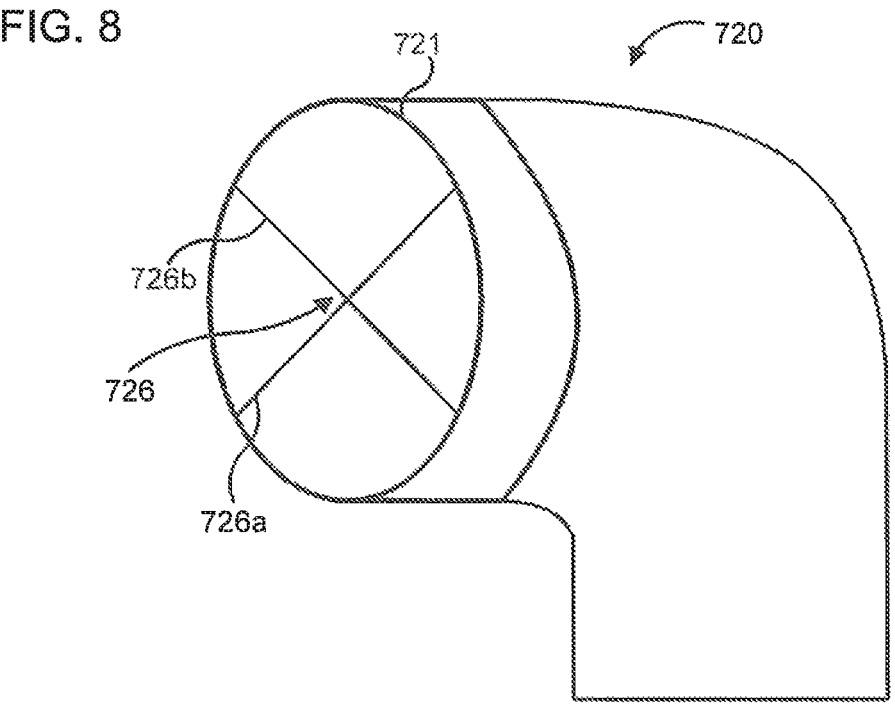
FIG. 8 is a side cross-section view of an outlet conduit including a swirl breaking structure positioned at an outlet conduit inlet thereof, according to a particular embodiment.

FIG. 8 is a side cross-section view of an outlet conduit 720, according to yet another embodiment. The outlet conduit 720 may be used with the crankcase ventilation system 100 or any other crankcase ventilation system described herein. The outlet conduit 720 comprises a swirl breaking structure 726 positioned at an outlet conduit inlet 721 which is structured to receive a fluid (e.g., from the crankcase ventilation system 100). The swirl breaking structure 726 comprises a first plate 726a positioned diagonally at a first angle in the outlet conduit inlet 721, and a second plate 726b also positioned diagonally in the outlet conduit inlet 721 perpendicular to the first plate 726*a*, such that the first plate 726*a* and the second plate 726*b* intersect at their respective midpoints.

Figure 9:
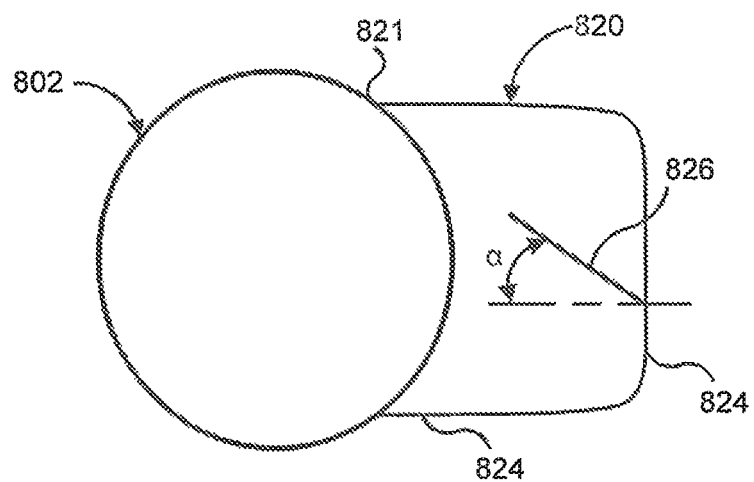
FIG. 9 is a top cross-section view of an outlet conduit including a baffle positioned in an outlet conduit second portion thereof, according to another embodiment.

FIG. 9 is a top cross-section view of an outlet conduit 820, according to another embodiment. The outlet conduit 820 comprises an outlet conduit inlet 821 fluidly coupled to a housing 802, which may be substantially similar to the housing 102 previously described herein. The outlet conduit 820 comprises an outlet conduit first portion 822 and an outlet conduit second portion 824. A baffle 826 for breaking swirls in a fluid flowing into the outlet conduit 820 is positioned on a backwall of the outlet conduit second portion 824 and extends at an angle α with respect to a flow axis of the fluid entering the outlet conduit first portion 822 towards the outlet conduit inlet 821 from the backwall.

Figure 10:
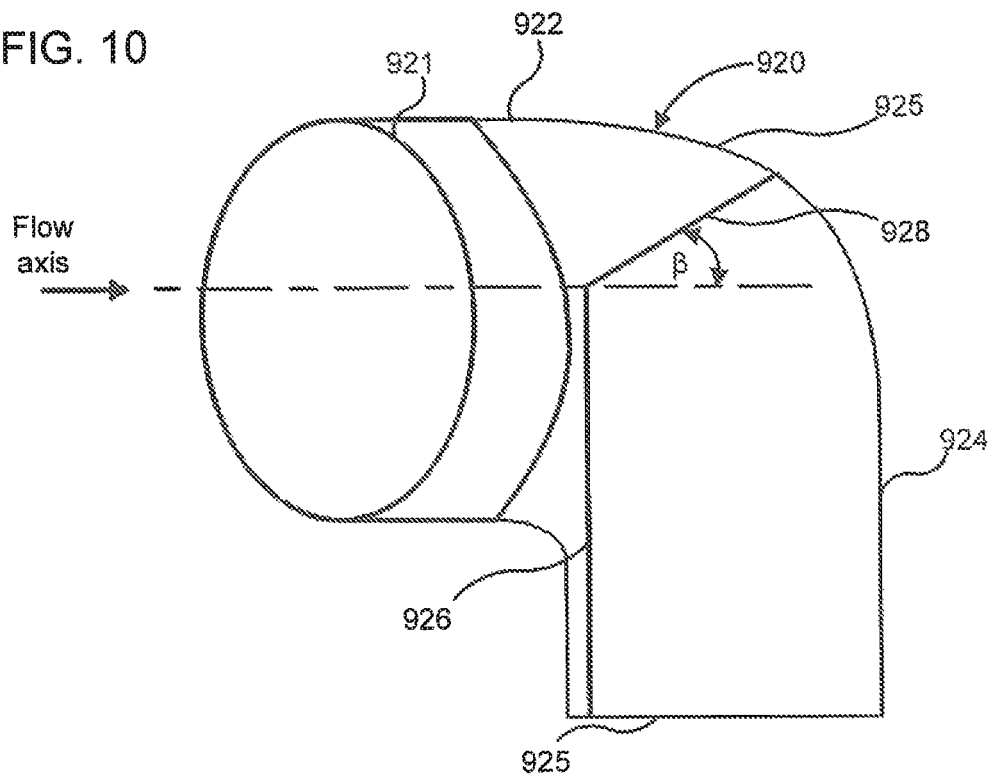
FIG. 10 is a side cross-section of an outlet conduit including a baffle positioned in an outlet conduit second portion thereof, according to yet another embodiment.

FIG. 10 is a side cross-section view of an outlet conduit 920, according to yet another embodiment. The outlet conduit 920 comprises an outlet conduit inlet 921 structured to be fluidly coupled to a housing, for example, the housing 102 previously described herein. The outlet conduit 920 comprises an outlet conduit first portion 922 and an outlet conduit second portion 924. A baffle 926 for breaking swirls in a fluid flowing into the outlet conduit 920 is positioned on a backwall of the outlet conduit second portion 924. The baffle 926 extends in a first direction from proximate to a first end 925 of the outlet conduit second portion 924 along an outlet conduit second portion longitudinal axis towards an outlet conduit outlet 927, and in a second direction towards the outlet conduit inlet 921. Furthermore, a baffle edge 928 of the baffle facing the first end 925 is inclined at an angle β with respect to a flow axis of the fluid entering the outlet conduit inlet 921. In other embodiments, the baffle edge 928 may define a curve (e.g., concave, convex or any other curvature).

Figure 11:
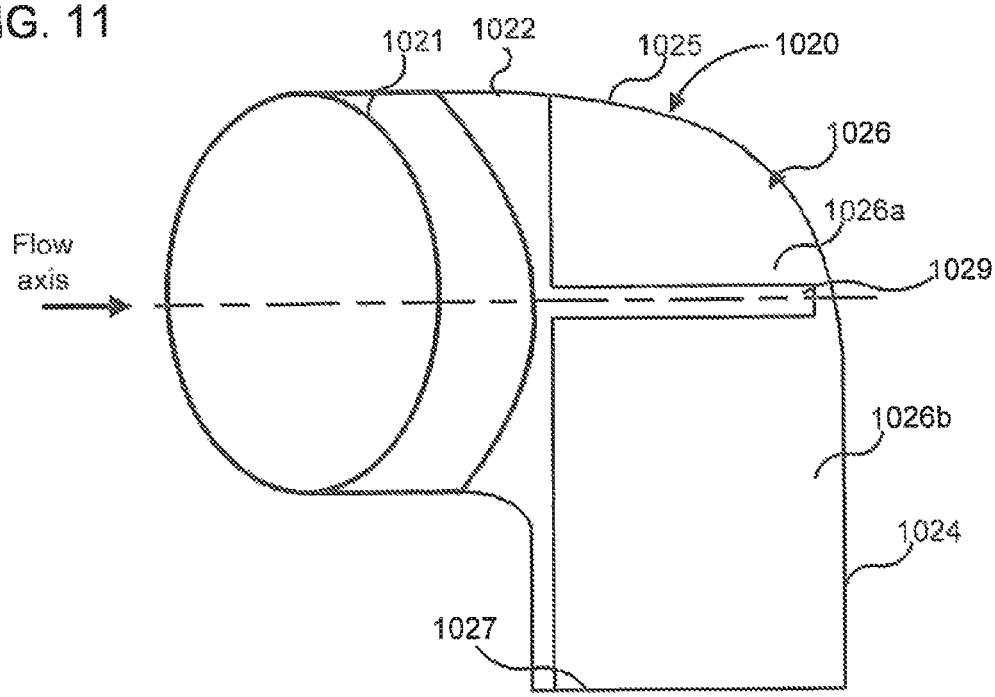
FIG. 11 is a side cross-section of an outlet conduit including a baffle positioned in an outlet conduit second portion thereof, according to still another embodiment.

FIG. 11 is a side cross-section view of an outlet conduit 1020, according to still another embodiment. The outlet conduit 1020 comprises an outlet conduit inlet 1021 structured to be fluidly coupled to a housing, for example, the housing 102 previously described herein. The outlet conduit 1020 comprises an outlet conduit first portion 1022 and an outlet conduit second portion 1024. A baffle 1026 is positioned in the outlet conduit second portion 1024 and extends from a first end 1025 of the outlet conduit first portion 1022 proximate to the outlet conduit second portion 1024 towards an outlet conduit outlet 1027. A baffle slit 1029 is defined in the baffle 1026, for example, axially aligned with a flow axis of the fluid flowing into the outlet conduit 1020 or at any other location, such that the baffle 1026 has a baffle first portion 1026*a* positioned proximate to the first end 1025, and a baffle second portion 1026*b* positioned below the baffle first portion 1026*a*, with the baffle slit 1029 defined therebetween.

Figure 12:
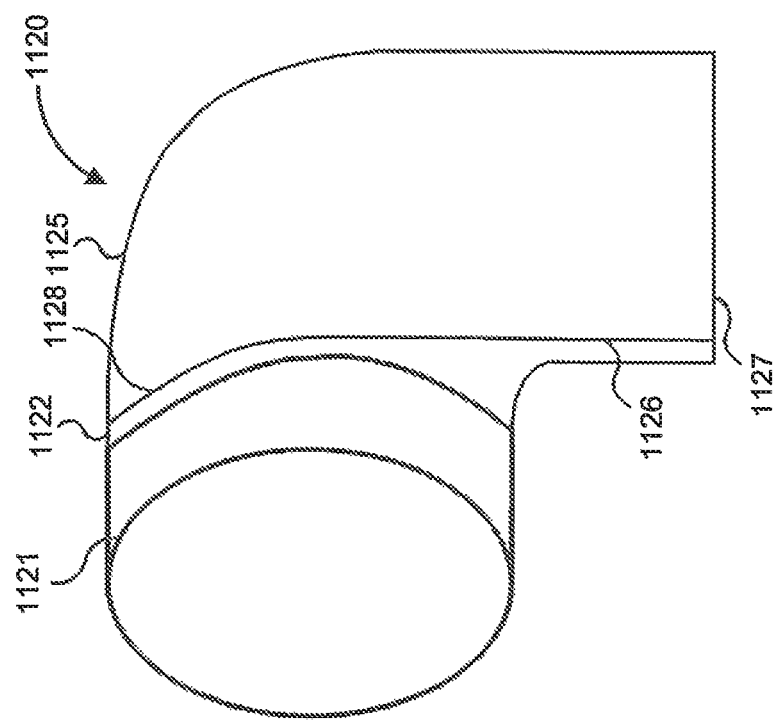
FIG. 12 is a side cross-section of an outlet conduit including a baffle positioned in an outlet conduit second portion thereof, according to yet another embodiment.

FIG. 12 is a side cross-section view of an outlet conduit 1120, according to a particular embodiment. The outlet conduit 1120 comprises an outlet conduit inlet 1121 structured to be fluidly coupled to a housing, for example, the housing 102 previously described herein. The outlet conduit 1120 comprises an outlet conduit first portion 1122 and an outlet conduit second portion 1124. A baffle 1126 for breaking swirls in a fluid flowing into the outlet conduit 1120 is positioned on a backwall of the outlet conduit second portion 1124. The baffle 1126 extends in a first direction from a first end 1125 of the outlet conduit second portion 1124 along an outlet conduit second portion longitudinal axis towards an outlet conduit outlet 1127, and in a second direction towards the outlet conduit inlet 1121. Furthermore, at least a portion of a baffle edge 1128 of the baffle 1126 facing the outlet conduit inlet 1121 defines a curvature (e.g., an arc or a taper) towards the outlet conduit inlet 1121, such that that the baffle edge 1128 may curve into the outlet conduit first portion 1122.

Figure 13:
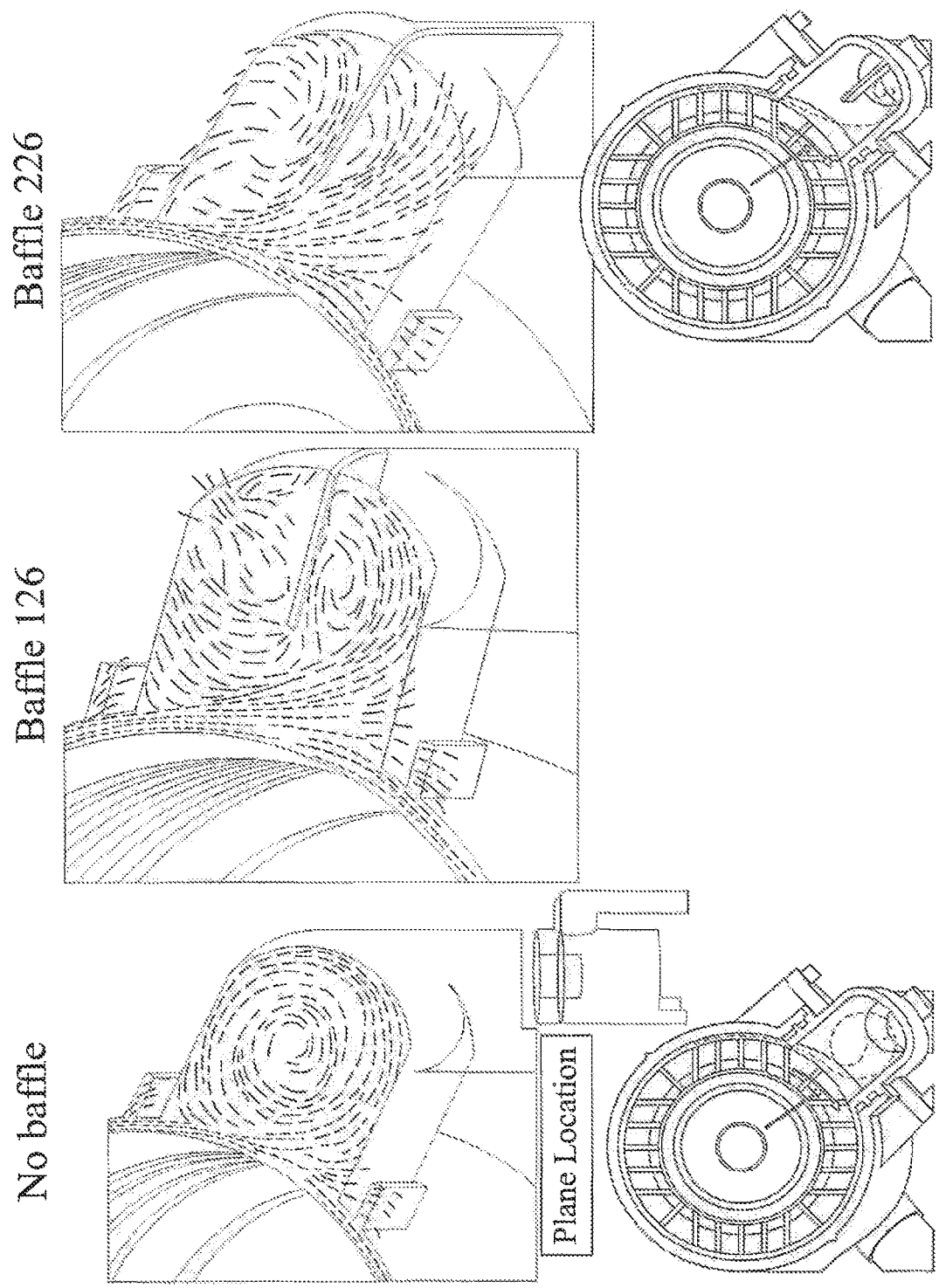
FIGS. 13-15 are computational fluid dynamic (CFD) simulations showing the fluid flow velocity pathlines, total pressure drop pathlines and velocity magnitude pathlines, respectively of a fluid flowing through the crankcase ventilation system of FIG. 1 with no baffle, with the baffle of FIG. 2 (baffle 126), and the baffle of FIG. 3 (baffle 226) positioned in an outlet conduit thereof.
Figure 14:
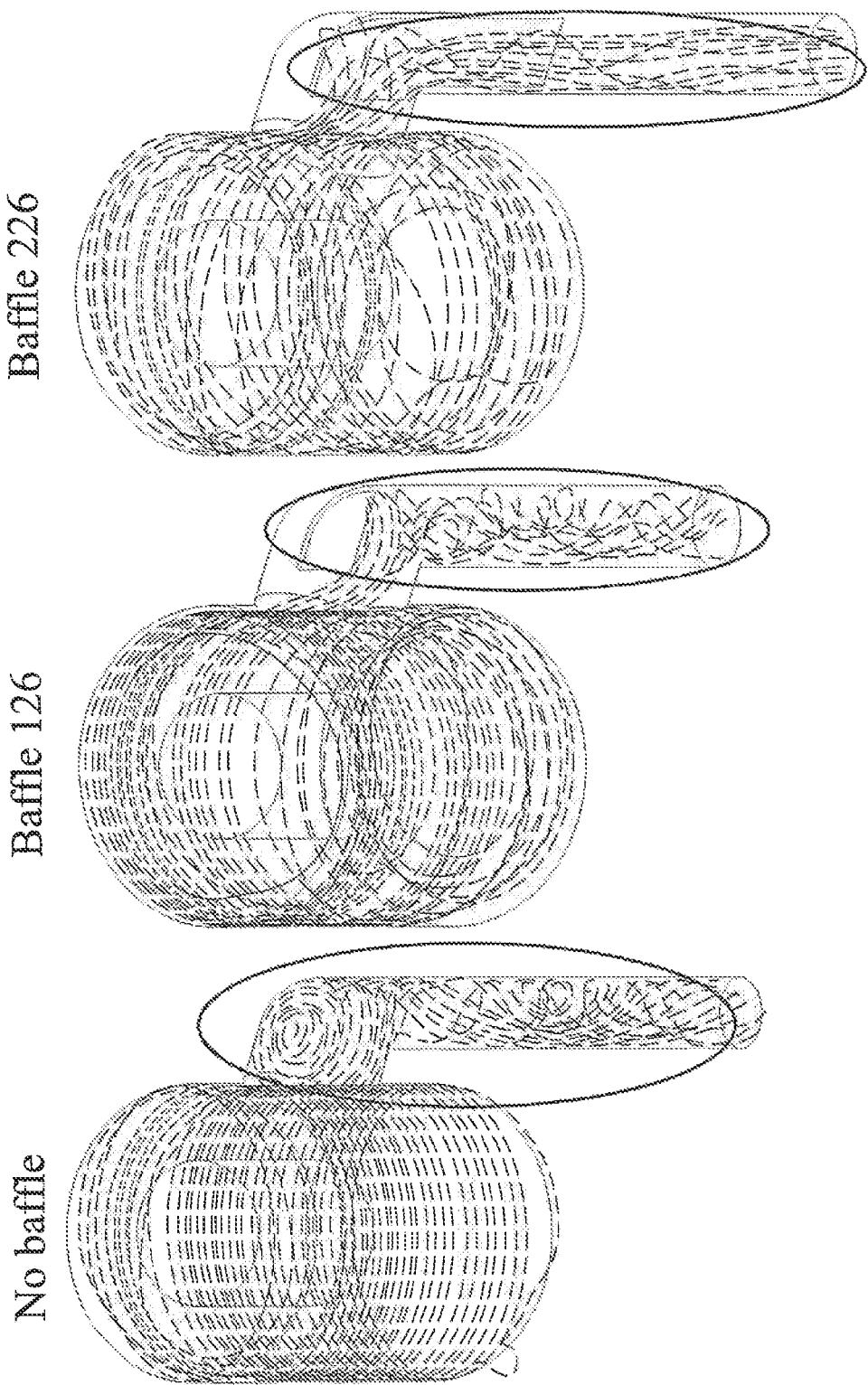
Figure 15:
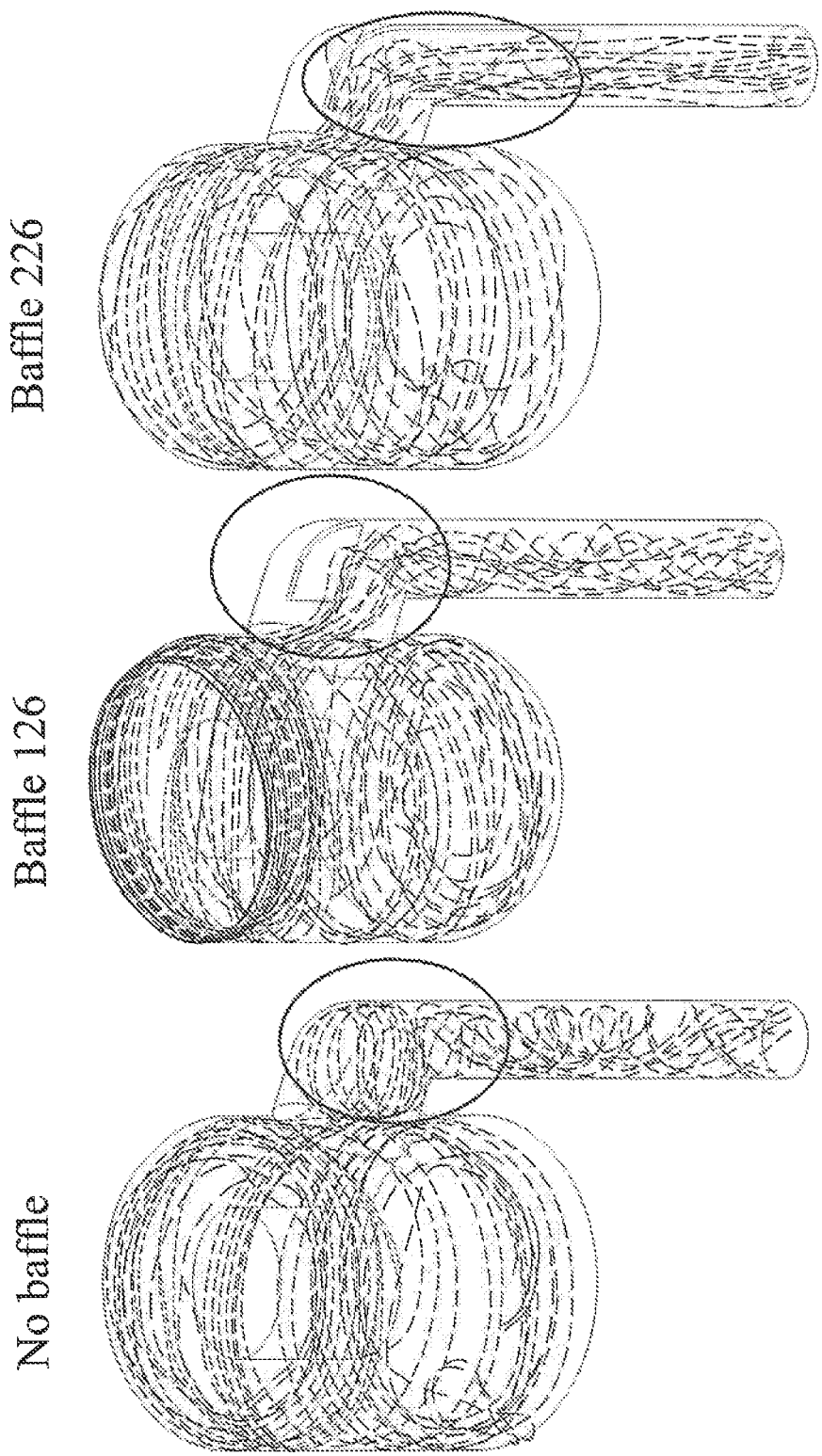

FIGS. 13-15 are CFD simulations showing the fluid flow pathlines, total pressure drop pathlines, and velocity magnitude pathlines, respectively of a fluid flowing through the crankcase ventilation system 100 of FIG. 1 with no baffle, with the baffle of FIG. 2 (baffle 126), and the baffle of FIG. 3 (baffle 226) positioned in an outlet conduit thereof. As can be observed from FIGS. 13-15, the swirl in the fluid flow entering and flowing through the outlet conduit 120 is significantly reduced by including the baffle 126 in the outlet conduit 120 and even further reduced by including the baffle 226 in the outlet conduit 120. The reduction in pressure drop by including the baffle 226 in the outlet conduit 120 may be up to 20%.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present application.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A crankcase ventilation system, comprising:
   a housing defining an internal volume structured to receive a rotating air/oil separator element, the housing having a housing inlet structured to receive a fluid and a housing outlet defined tangentially in a sidewall of the housing, the housing outlet structured to allow fluid to exit the housing;
   an outlet conduit fluidly coupled to the housing outlet, the outlet conduit comprising an outlet conduit first portion axially aligned with the housing outlet, and an outlet conduit second portion positioned downstream of the outlet conduit first portion, the outlet conduit second portion being perpendicular to the outlet conduit first portion; and
   a swirl breaking structure positioned in the outlet conduit second portion, the swirl breaking structure configured to disrupt swirling flow of the fluid into the outlet conduit so as to reduce a pressure drop experienced by the fluid as the fluid flows from the housing into the outlet conduit,
   the swirl breaking structure comprising a baffle positioned in the outlet conduit second portion, the baffle extending along an outlet conduit second portion longitudinal axis between a first end of the outlet conduit second portion and an outlet conduit outlet to define a baffle height, the first end of the outlet conduit second portion being proximate to the outlet conduit first portion.

2. The crankcase ventilation system of claim 1, wherein the baffle comprises a vertical plate positioned in the outlet conduit second portion.

3. The crankcase ventilation system of claim 2, wherein the baffle height is less than or equal to a height of the outlet conduit second portion.

4. The crankcase ventilation system of claim 2, wherein the baffle extends in a first direction along the baffle height and in a second direction from a backwall of the outlet conduit second portion towards an outlet conduit inlet so as to define a baffle length, the baffle length being less than or equal to a width of the outlet conduit second portion.

5. The crankcase ventilation system of claim 2, wherein the baffle extends from a backwall of the outlet conduit second portion at an angle with respect to a flow axis of the fluid entering the outlet conduit first portion towards an outlet conduit inlet.

6. The crankcase ventilation system of claim 2, wherein the baffle comprises a baffle edge facing the first end of the outlet conduit second portion proximate to the outlet conduit first portion, the baffle edge inclined at angle with respect to a flow axis of the fluid entering an outlet conduit inlet.

7. The crankcase ventilation system of claim 2, wherein the baffle comprises a baffle edge facing an outlet conduit inlet, the baffle edge defining a curvature towards the outlet conduit inlet.

8. The crankcase ventilation system of claim 2, wherein a baffle slit is defined in the baffle, the baffle slit dividing the baffle into a baffle first portion position proximate to a first end of the outlet conduit first portion that is proximate to the outlet conduit second portion, and a baffle second portion positioned distal from the outlet conduit first portion.

9. The crankcase ventilation system of claim 1, wherein the baffle comprises a wedge extending from a backwall of the outlet conduit second portion towards an outlet conduit inlet, the wedge having one or more curved surfaces.

10. The crankcase ventilation system of claim 1, wherein the swirl breaking structure comprises a mesh or a grid positioned at an outlet conduit inlet.

11. The crankcase ventilation system of claim 1, wherein the swirl breaking structure comprises a plurality of plates positioned at an outlet conduit inlet such that axial ends of each of the plurality of plates are coupled to a rim of the outlet conduit inlet, the plurality of plates intersecting at midpoints thereof.

12. An outlet conduit for a housing of a rotating air/oil separator element, the outlet conduit comprising:
    an outlet conduit first portion having an outlet conduit inlet configured to be fluidly coupled to a housing outlet defined tangentially in a sidewall of the housing such that the outlet conduit first portion is axially aligned with the housing outlet, the outlet conduit first portion being configured to receive fluid expelled from the housing outlet;
    an outlet conduit second portion positioned downstream of the outlet conduit first portion, the outlet conduit second portion being perpendicular to the outlet conduit first portion; and
    a swirl breaking structure positioned in the outlet conduit second portion, the swirl breaking structure configured to disrupt swirling flow of the fluid into the outlet conduit so as to reduce a pressure drop experienced by the fluid as the fluid flows from the housing into the outlet conduit,
    the swirl breaking structure comprising a baffle positioned in the outlet conduit second portion, the baffle extending along an outlet conduit second portion longitudinal axis between a first end of the outlet conduit second portion and an outlet conduit outlet to define a baffle height, the first end of the outlet conduit second portion being proximate to the outlet conduit first portion.

13. The outlet conduit of claim 12, wherein the baffle comprises a vertical plate positioned in the outlet conduit second portion.

14. The outlet conduit of claim 13, wherein the baffle height is less than or equal to a height of the outlet conduit second portion.

15. The outlet conduit of claim 13, wherein the baffle extends in a first direction along the baffle height and in a second direction from a backwall of the outlet conduit second portion towards the outlet conduit inlet so as to define a baffle length, the baffle length being less than or equal to a width of the outlet conduit second portion.

16. The outlet conduit of claim 13, wherein the baffle extends from a backwall of the outlet conduit second portion at an angle with respect to a flow axis of the fluid entering the outlet conduit first portion towards the outlet conduit inlet.

17. The outlet conduit of claim 13, wherein the baffle comprises a baffle edge facing the first end of the outlet conduit second portion proximate to the outlet conduit first portion, the baffle edge inclined at angle with respect to a flow axis of the fluid entering the outlet conduit inlet.

18. The outlet conduit of claim 13, wherein the baffle comprises a baffle edge facing the outlet conduit inlet, the baffle edge defining a curvature towards the outlet conduit inlet.

19. The outlet conduit of claim 13, wherein a baffle slit is defined in the baffle, the baffle slit dividing the baffle into a baffle first portion positioned proximate to a first end of the outlet conduit first portion that is proximate to the outlet conduit second portion, and a baffle second portion positioned distal from the outlet conduit first portion.

20. The outlet conduit of claim 12, wherein the baffle comprises a wedge extending from a backwall of the outlet conduit second portion towards the outlet conduit inlet, the wedge having one or more curved surface.

21. The outlet conduit of claim 12, wherein the swirl breaking structure comprises a mesh or a grid positioned at the outlet conduit inlet.

22. The outlet conduit of claim 12, wherein the swirl breaking structure comprises a plurality of plates positioned at the outlet conduit inlet such that axial ends of each of the plurality of plates are coupled to a rim of the outlet conduit inlet, the plurality of plates intersecting at midpoints thereof.

* * * * *